US012692992B2

(12) United States Patent
Lin et al.

(10) Patent No.: US 12,692,992 B2
(45) Date of Patent: Jul. 28, 2026

(54) LIGHTING STRUCTURE

(71) Applicant: SILITECH TECHNOLOGY CORP., New Taipei City (TW)

(72) Inventors: Yen-Chih Lin, New Taipei City (TW); Long-Jyh Pan, New Taipei City (TW); Chinyi Chou, New Taipei City (TW)

(73) Assignee: SILITECH TECHNOLOGY CORP., New Taipei City (TW)

( * ) Notice: Subject to any disclaimer, the term of this patent is extended or adjusted under 35 U.S.C. 154(b) by 0 days.

(21) Appl. No.: 19/042,256

(22) Filed: Jan. 31, 2025

(65) Prior Publication Data

US 2025/0251098 A1     Aug. 7, 2025

(30) Foreign Application Priority Data

Feb. 7, 2024    (TW) ................................. 113201606

(51) Int. Cl.
| | |
|---|---|
| *F21K 9/61* | (2016.01) |
| *F21K 9/66* | (2016.01) |
| *G06F 3/044* | (2006.01) |
| *F21W 106/00* | (2018.01) |
| *F21Y 115/10* | (2016.01) |

(52) U.S. Cl.
CPC ................... F21K 9/61 (2016.08); F21K 9/66 (2016.08); G06F 3/044 (2013.01); *F21W 2106/00* (2018.01); *F21Y 2115/10* (2016.08)

(58) Field of Classification Search
CPC .. F21K 9/61; F21K 9/66; G06F 3/044; F21W 2106/00; F21Y 2115/10; G09F 2013/222; G09F 21/049; G09F 13/044; G09F 13/049; G09F 13/0422; G02B 6/006
See application file for complete search history.

(56) References Cited

U.S. PATENT DOCUMENTS

| | | | |
|---|---|---|---|
| 7,914,195 B2* | 3/2011 | Sawada ................. | G02B 6/0076 |
| | | | 362/616 |
| 2003/0210537 A1* | 11/2003 | Engelmann ............ | H03K 17/96 |
| | | | 362/276 |
| 2009/0179548 A1* | 7/2009 | Lai ........................ | G02B 6/0038 |
| | | | 313/498 |
| 2016/0216434 A1* | 7/2016 | Shih ........................ | G02B 6/006 |
| 2023/0245602 A1* | 8/2023 | Peterson ................... | G09F 9/33 |
| | | | 315/291 |

* cited by examiner

*Primary Examiner* — Evan P Dzierzynski

(74) *Attorney, Agent, or Firm* — Demian K. Jackson; Jackson IPG PLLC

(57) ABSTRACT

The present invention relates to a lighting structure. The lighting structure includes: an appearance decorative component; a light-emitting unit emitting an LED light when activated; a circuit substrate configured to provide the light-emitting unit to be configured thereon and to control the light-emitting unit; and a light guide configured to guide the LED light to propagate toward the appearance decorative component.

6 Claims, 4 Drawing Sheets

100

100

100

100

100

LIGHTING STRUCTURE

CROSS-REFERENCE TO RELATED APPLICATION

This application claims priority benefit to Taiwan Utility Model patent application No. 113201606, filed on Feb. 7, 2024, in Taiwan Intellectual Property Office, the entire disclosures of which are incorporated by reference herein.

FIELD

The present invention relates to a lighting structure, in particular to a lighting structure capable of presenting different information within the same display area.

BACKGROUND

Nowadays, with the rapid development of electric vehicles and smart cars, consumers have become increasingly demanding in terms of the variety and aesthetics of in-vehicle lighting decorations. In addition to seeking more exquisite, personalized and visually appealing lighting effects, consumers also expect lighter and more aesthetically pleasing structures, as well as lower energy consumption and improved environmental friendliness.

As a result, the modern automotive industry has generated a variety of requirements for interior lighting decorations. These demands include applications such as ambient lighting panels, wood grain-like illuminated decorations, transparent crystal-like central control decorations, dashboard lighting, in-vehicle entertainment systems, switch lighting, cabin lighting, warning lights, indicator lights, co-pilot seat lighting, and ambient lighting. These applications not only provide basic lighting functions, but are also closely related to information display and indication functions.

Most of these in-vehicle lighting applications utilize LED lighting structures due to their characteristics of high brightness, energy efficiency, color variability, and long life, which make them ideal for information display and indication. For example, various LED indicator lights installed in the vehicle interior are used to inform the driver of the vehicle status and operational information, such as unbuckled seat belts, low fuel level, and engine malfunction. These indicator lights are also used to provide warnings and reminders to alert the driver.

In addition, various LED indicator lights integrated into switches and buttons are used to indicate the on or off status of control components. Generally, when a switch is toggled to an active or inactive state, the corresponding LED light will illuminate to notify the driver of the activation or deactivation of a particular function. Automotive dashboards, on the other hand, use small to medium-sized LED panels to display various driving information, including speed, RPM, oil pressure, temperature, and mileage, allowing the driver to easily monitor the vehicle's operating status.

Furthermore, LED light-emitting units are no longer used solely for illumination, but are increasingly being used as information display or display units. However, due to the limited space in the vehicle, the dimensions and surface areas of various switches, indicators, and panels are severely limited. As a result, the challenge of displaying more comprehensive and diverse information within these limited spaces has become a significant technical challenge in the field of automotive LED lighting technology and an urgent issue to be addressed.

Hence, there is a need to solve the above deficiencies/issues. In view of the deficiencies existing in the prior art, the inventors, through dedicated efforts and research, have conceived the present invention, "Lighting Structure", which addresses the aforementioned above deficiencies. A brief description of the invention is provided below.

SUMMARY

The present invention relates to a lighting structure, in particular to a lighting structure capable of presenting different information within the same display area.

Accordingly, the present invention provides a lighting structure. The lighting structure includes: an appearance decorative component; a light-emitting unit emitting an LED light when activated; a circuit substrate configured to provide the light-emitting unit to be configured thereon and to control the light-emitting unit; and a light guide configured to guide the LED light to propagate toward the appearance decorative component.

The present invention further provides a lighting structure. The lighting structure includes: a first light-emitting unit and a second light-emitting unit emitting a first LED light and a second LED light, respectively, when activated; a circuit substrate configured to provide the first light-emitting unit and the second light-emitting unit to be configured thereon and to individually control the first light-emitting unit and the second light-emitting unit; a first light guide and a second light guide configured to guide the first LED light and the second LED light, respectively; and an appearance decorative component configured above the first light guide and the second light guide.

The present invention further provides a lighting structure. The lighting structure includes: an appearance decorative component; a light-emitting unit emitting an LED light when activated; a circuit substrate configured to provide the light-emitting unit to be configured thereon and to control the light-emitting unit; a light guide configured to guide the LED light to propagate toward the appearance decorative component; and a light-transmitting touch panel module attached to one side of the appearance decorative component.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
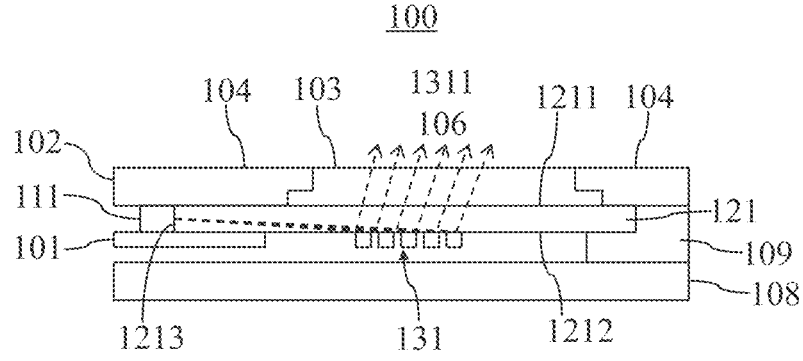
FIG. 1 is a schematic diagram illustrating the structure of the first embodiment for the lighting structure included in the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

For most conventional automotive in-vehicle decorative lighting components, it is used to use LEDs or incandescent bulbs as the light source, and the light is then guided to the appearance decorative component having various the locally light-transmitting areas directly or indirectly by light guides. The lighting pattern is totally defined and determined by the patterns of the locally light-transmitting areas on the appearance decorative component, and therefore it is inevitable to have locally "non-transmitting" areas on the appearance decorative component.

Therefore, it would be tough for users to achieve the purpose by using conventional or general automotive in-vehicle decorative lighting component structures if users intend to have a crystal-like transparent decorative lighting component, in which the illuminated pattern appears only when the light source is activated and becomes dimly or hazily visible or invisible when the light source is deactivated.

Figure 2:
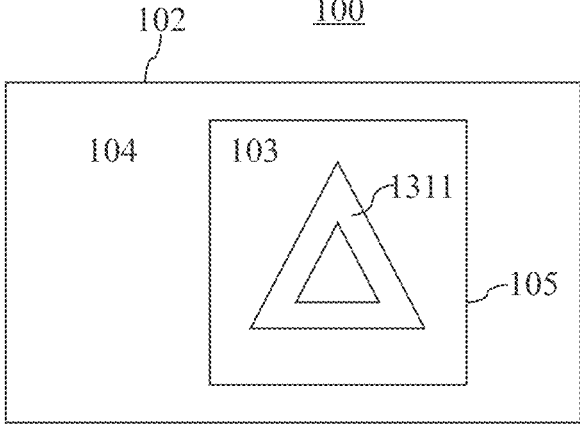
FIG. 2 is a schematic diagram illustrating the first information formed by the optically reflective information structure according to the present invention.

FIG. 1 is a schematic diagram illustrating the structure of the first embodiment for the lighting structure included in the present invention; FIG. 2 is a schematic diagram illustrating the first information formed by the optically reflective information structure according to the present invention. In the present embodiment, the lighting structure 100 includes a circuit substrate 101, a first LED light-emitting unit 111, a first light guide 121, and an appearance decorative component 102. The first LED light-emitting unit 111 is configured on the circuit substrate 101 and to emit LED light 106 when activated. The first light guide 121 is configured on a spacer 109 supported by a frame 108. The emitted LED light 106 includes, but is not limited to, colors such as white, red, blue, yellow, or green.

The appearance decorative component 102 is preferably made of one of or a combination of a transparent silicone material, a PC material, a PMMA material, a PET material, a COP material, a plastic material, a glass material, or a light-transmitting material. The appearance decorative component 102 preferably includes a light-transmitting portion 103 and a non-transmitting portion 104. In one embodiment, the non-transmitting portion 104 is preferably formed by printing a non-transmitting area over the light-transmitting portion 103 by using, for example, but not limited to, printing methods. In one embodiment, the light-transmitting portion 103 and the non-transmitting portion 104 are formed by using a dual injection molding with both a light-transmitting plastic and a non-transmitting plastic.

The non-transmitting portion 104 included in the appearance decorative component 102 is used to form an opaque area on the appearance decorative component 102 to shield, for example, but not limited to, the underlying circuit traces and electronic components. The light-transmitting portion 103 included in the appearance decorative component 102 is used to form a display area 105 on the appearance decorative component 102. The non-transmitting portion 104 is configured to provide to define the boundaries of the display area 105.

The circuit substrate 101 further includes control circuitry necessary to drive and control the first LED light-emitting unit 111, such as turning on or off the first LED light-emitting unit 111, adjusting the brightness, and changing the colors of the first LED light-emitting unit 111. The first LED light-emitting unit 111 is preferably a side-emitting LED component, a side-view LED component or a side-viewing LED component. The first LED light-emitting unit 111 is preferably a small-sized, high-brightness, low-power LED light source, such as but not limited to SMD LED chips or COB LED sources.

The first light guide 121 is preferably a light guide film (LGF) and is configured to guide the LED light 106 emitted from the first LED light-emitting unit 111 to propagate toward the appearance decorative component 102 and to convert the LED light 106 from a point light source to a surface light source. The first light guide 121 is preferably made of one of or a combination of a transparent silicone, a PC material, a PMMA material, a PET material, a COP material, a plastic material, a glass material, or a light guide capable material.

The first light guide 121 includes a first surface 1211, a second surface 1212, and a third surface 1213. The first surface 1211 and the second surface 1212 are preferably the front surface and the back surface, respectively, of the first light guide 121. The second surface 1212 is preferably the surface of the first light guide 121 opposite to the first surface 1211. The third surface 1213 is preferably the side surface of the first light guide 121, and the third surface 1213 has an area that is smaller than that of the first surface 1211 or the second surface 1212.

Preferably, the first light guide 121 has the second surface 1212 that includes an optically reflective information structure 131 formed thereon. The optically reflective information structure 131 is preferably formed by methods such as printing reflective ink, hot stamping, ink jet printing, hot press molding, laser engraving, screen printing, thermal transfer, steel mold embossing, etching, or combinations thereof, so as to modify the optical properties for the second surface 1212 to enhance its reflectivity toward the first surface 1211.

The optically reflective information structure 131 includes a first information 1311, which preferably includes colors, symbols, numbers, text, patterns, or combinations thereof. When the first LED light-emitting unit 111 is turned on to illuminate the optically reflective information structure 131, the first information 1311 is displayed with a luminous effect. When the first LED light emitting unit 111 is turned off to de-illuminate the first information 1311, although the visibility of the first information 1311 is reduced due to the lack of illumination, the first information is still visible to create a semi-hidden or semi-concealed decorative effect mixed with a hazy or blurry visual effect.

The LED light 106 emitted from the first LED light-emitting unit 111 is configured to enter the first light guide 121 from the third surface 1213 of the first light guide 121. After being diffused and scattered by the first light guide 121, the LED light 106 arrives at the optically reflective information structure 131 formed on the second surface 1212, and then is reflected by the optically reflective information structure 131. Then, the reflected light exits from the first surface 1211, and the first information 1311 represented by the optically reflective information structure 131 is thus illuminated to be displayed in the light-transmitting portion 103.

Figure 3:
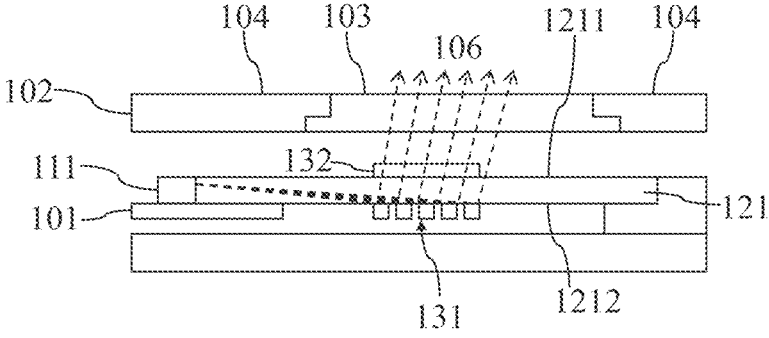
FIG. 3 is a schematic diagram illustrating the structure of the second embodiment for the lighting structure included in the present invention.

FIG. 3 is a schematic diagram illustrating the structure of the second embodiment for the lighting structure included in the present invention. The second embodiment is based on and includes the first embodiment. In the present embodiment, an optical information structure 132 is formed on the front side, either the first surface 1211, of the first light guide 121. The optical information structure 132 is preferably formed by methods such as printing ink, hot stamping, ink jet printing, hot press molding, laser engraving, screen printing, thermal transfer, steel mold embossing, etching, or combinations thereof.

The optical information structure 132 is preferably an artwork layer and includes a second information 1321. The second information 1321 preferably includes colors, symbols, numbers, text, patterns, or combinations thereof. When the first LED light-emitting unit 111 is turned off, since the optical information structure 132 is positioned on the top layer, the front surface, i.e., the first surface 1211 of the first light guide 121, the second information 1321 is naturally visible when illuminated by ambient light. When the first LED light-emitting unit 111 is turned on, the second information 1321 is illuminated to appear with a luminous effect after the optical information structure 132 is illuminated.

Figure 4:
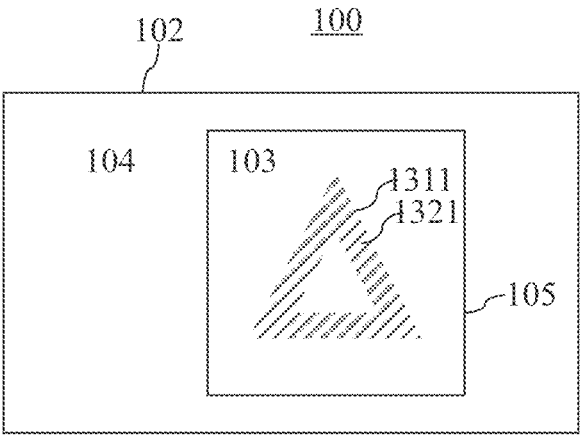
FIG. 4 is a schematic diagram illustrating the optical information structure and the first information and the second information displayed from the optically reflective information structure according to the present invention.

FIG. 4 is a schematic diagram illustrating the optical information structure and the first information and the second information displayed from the optically reflective information structure according to the present invention. The optically reflective information structure 131 and the optical information structure 132 are preferably configured to be either corresponding or non-corresponding in position. Likewise, the first information 1311 and the second information 1321 are preferably configured to be either corresponding or non-corresponding in position. The optically reflective information structure 131 and the optical information structure 132 are preferably identical or different in style, as well as the first information 1311 and the second information 1321 are preferably identical or different in style.

In one embodiment, the optically reflective information structure 131 is preferably formed by steel mold embossing to create a dense array of optically reflective concave dots that collectively form a triangular pattern to display the first information 1311. The optical information structure 132 is preferably formed by ink jet printing to create multiple diagonal lines parallel to each other with a color such as, but not limited to, red. These diagonal lines collectively form a hollow triangular pattern to display the second information 1321.

For example, when the optically reflective information structure 131 and the optical information structure 132 are illuminated by the LED light 106, the first information 1311 and the second information 1321 are simultaneously displayed in the display area 105. With different colors, such as white color, the LED light 106 represent, when the first information 1311 and the second information 1321 are corresponded in position, the overlapped first information 1311 and the second information 1321 specifically demonstrates a triangular pattern with a white color background inside surrounded by a hollow triangular outline that is formed by multiple red diagonal stripes.

Figure 5:
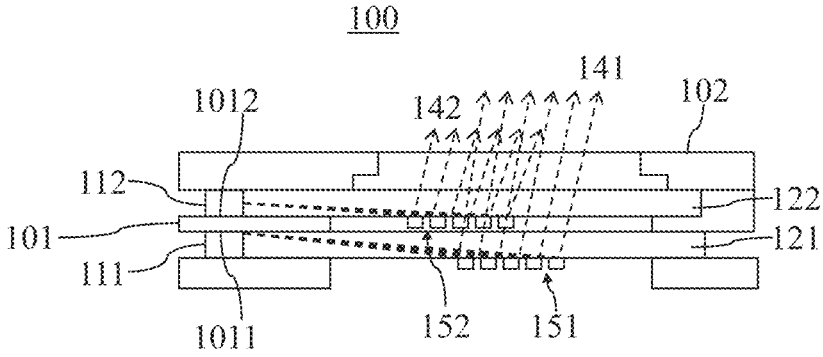
FIG. 5 is a schematic diagram illustrating the structure of the third embodiment for the lighting structure included in the present invention.

FIG. 5 is a schematic diagram illustrating the structure of the third embodiment for the lighting structure included in the present invention. The third embodiment is based on and includes both the first embodiment and the second embodiment. In the present embodiment, the lighting structure 100 further includes a second LED light-emitting unit 112 and a second light guide 122. The first light guide 121 and the second light guide 122 include a first optically reflective information structure 151 and a second optically reflective information structure 152, respectively, which contain the third information 1511 and the fourth information 1521, respectively.

The first LED light-emitting unit 111 and the second LED light-emitting unit 112 are configured on the first surface 1011 and the second surface 1012 of the circuit substrate 101, respectively, and positioned on the same side. The circuit substrate 101 is preferably configured to drive and control the first LED light-emitting unit 111 and the second LED light-emitting unit 112 individually. The first light guide 121 and the second light guide 122 are configured on either sides of the circuit substrate 101 and configured to abut against the first LED light-emitting unit 111 and the second LED light-emitting unit 112, respectively, to guide the first LED light 141 and the second LED light 142 emitted from the first LED light-emitting unit 111 and the second LED light-emitting unit 112, respectively. The colors emitted from the first LED light 141 and the second LED light 142 include, but are not limited to, white, red, blue, yellow, or green.

Preferably, the first optically reflective information structure 151 and the second optically reflective information structure 152 are preferably configured to be either corresponding or non-corresponding in position. Likewise, the third information 1511 and the fourth information 1521 are preferably configured to be either corresponding or non-corresponding in position. The first optically reflective information structure 151 and the second optically reflective information structure 152 are preferably identical or different in style, as well as the third information 1511 and the fourth information 1521 are preferably identical or different in style.

Figure 6:
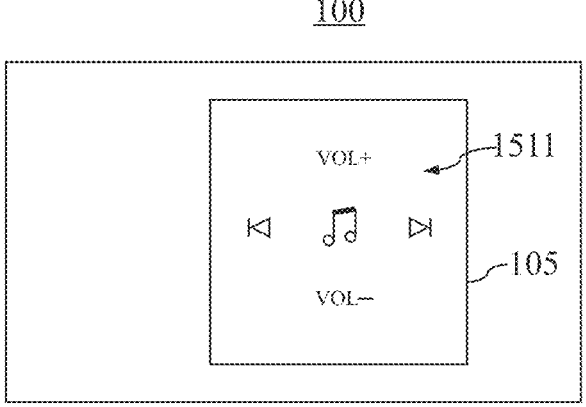
FIG. 6 is a schematic diagram illustrating the third information displayed from the first optically reflective information structure according to the present invention.
Figure 7:
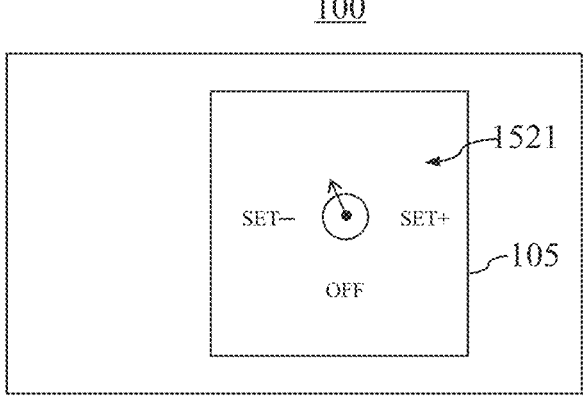
FIG. 7 is a schematic diagram illustrating the fourth information displayed from the second optically reflective information structure according to the present invention.

FIG. 6 is a schematic diagram illustrating the third information displayed from the first optically reflective information structure according to the present invention; FIG. 7 is a schematic diagram illustrating the fourth information displayed from the second optically reflective information structure according to the present invention. In one embodiment, when only the first LED light-emitting unit 111 is independently activated, only the first LED light 141 is emitted to illuminate the first optically reflective information structure 151 to display only the third information 1511 with a luminous effect. When only the second LED light-emitting unit 112 is independently activated, only the second LED light 142 is emitted to illuminate the second optically reflective information structure 152 to display only the fourth information 1521 with a luminous effect.

In one embodiment, the first optically reflective information structure 151 and the second optically reflective information structure 152 are preferably configured to be non-corresponding in position, and the third information 1511 and the fourth information 1521 are different in style. The third information 1511 is preferably designed to include a set of music-related text and symbols, while the fourth information 1521 is preferably designed to include a set of air conditioning strength-related text and symbols.

When only the first LED light-emitting unit 111 is independently activated and emits only the first LED light 141, only the first optically reflective information structure 151 is illuminated to display only the third information 1511 with a luminous effect in the display area 105, as shown in FIG. 6. Likewise, when only the second LED light-emitting unit 112 is independently activated and emits only the second LED light 142, only the second optically reflective information structure 152 is illuminated to display only the fourth information 1521 with a luminous effect in the display area 105, as shown in FIG. 7.

Thus, by using the lighting structure 100 provided in the present invention, it is possible to selectively display or conceal either the third information 1511 or the fourth information 1521 containing different information with a luminous effect, at a different position or an identical position within the same display area 105, by selectively illuminating the first optically reflective information structure 151 and the second optically reflective information structure 152, by selectively switching the first LED light-emitting unit 111 and the second LED light-emitting unit 112 between activation and deactivation.

In one embodiment, the first LED light-emitting unit 111 and the first light guide 121 collectively form a first single lighting layer, while the second LED light-emitting unit 112 and the second light guide 122 also collectively form a second single lighting layer. It is noted that the implementation of the present invention is not limited to the stacking of a two single lighting layers, but also covers implementations with three, four, or even multiple stacked single lighting layers.

In one embodiment, the first LED light-emitting unit 111 and the second LED light-emitting unit 112 are preferably still configured on the first surface 1011 and the second surface 1012 of the circuit substrate 101, respectively, but positioned on different sides. For example, the first LED light-emitting unit 111 is preferably configured on the left side of the of the circuit substrate 101, and the the second LED light-emitting unit 112 is preferably configured on the right side of the of the circuit substrate 101.

Therefore, the first light guide 121 and the second light guide 122 are illuminated by the first LED light-emitting unit 111 and the second LED light-emitting unit 112 positioned on different sides. By selectively switching the first LED light-emitting unit 111 and the second LED light-emitting unit 112 between activation and deactivation, it is also possible to selectively illuminate either the first optically reflective information structure 151 and the second optically reflective information structure 152, at a different position or an identical position within the same display area 105, to selectively display or conceal either the third information 1511 and the fourth information 1521 containing different information with a luminous effect.

Figure 8:
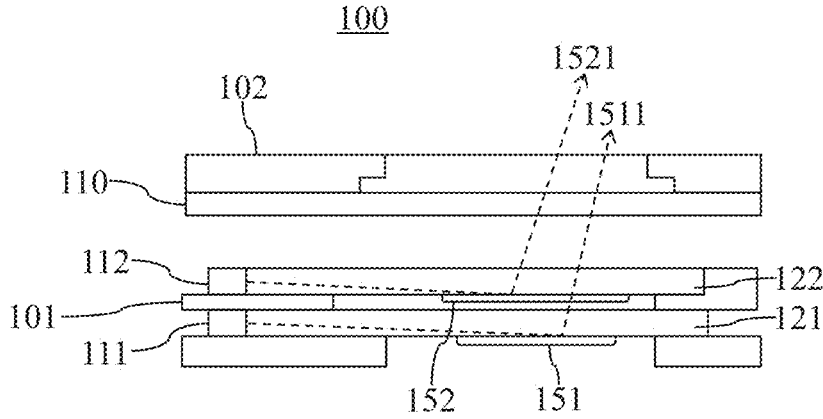
FIG. 8 is a schematic diagram illustrating the structure of the fourth embodiment for the lighting structure included in the present invention.

FIG. 8 is a schematic diagram illustrating the structure of the fourth embodiment for the lighting structure included in the present invention. The fourth embodiment is based on and includes the first through third embodiments. In the present embodiment, the lighting structure 100 further includes a touch sensor layer 110. The touch sensor layer 110 is incorporated into the lighting structure 100, for example, by being attached to the lower surface of the appearance decorative component 102. The touch sensor layer 110 is preferably a light-transmitting touch panel module.

With the installation of the touch sensor, the touch sensor layer 110 is configured to trigger, enable, or activate different functions in correspondence to different texts and symbols displayed by the third information 1511 and the fourth information 1521, to realize the technical effect of controlling multiple functions with a single touch switch.

The present invention provides a novel light guiding structure that combines a transparent appearance decorative component, a side-emitting LED, a light guide film (or panel), and a self-reflective pattern structure configured thereunder, so as to form a crystal-like transparent decorative lighting component. The lighting pattern on this component appears only when the light source is turned on, while it remains faintly, hazily or mistily visible or completely invisible when the light source is turned off.

The self-reflective pattern structure is positioned below the light guide film and is implemented using methods such as printing reflective ink, mold embossing, or etching patterns on the light guide film. Its function is to reflect the light transmitted by the LED through the light guide film, which enables the user to see the pattern formed by the reflective structure, rather than relying on the conventional method of using the arrangement of locally light-transmitting and non-transmitting areas to define the displayed/visible pattern. The advantages of this novel light guide structure are further provided as follows.

Providing a design for a crystal-like transparent decorative lighting component, in which the illuminated pattern appears only when the light source is turned on and becomes dimly visible or completely invisible when the light source is turned off; providing a design using light guide films, which saves module space and reduces module weight; enabling the use of multiple layers of light guide films with various reflective light patterns to create diverse usage scenarios and applications; and reducing energy and power consumption.

There are further embodiments provided as follows.

Embodiment 1: A lighting structure, includes: an appearance decorative component; a light-emitting unit emitting an LED light when activated; a circuit substrate configured to provide the light-emitting unit to be configured thereon and to control the light-emitting unit; and a light guide configured to abut a side of the light-emitting unit to guide the LED light to propagate toward the appearance decorative component.

Embodiment 2: The lighting structure according to Embodiment 1, the light guide further includes a second surface including an optically reflective information structure including a first information, wherein the optically reflective information structure displays the first information with a luminous effect when illuminated by the LED light.

Embodiment 3: The lighting structure according to Embodiment 2, the appearance decorative component includes a light-transmitting portion which provides for the first information to be displayed through the light-transmitting portion when the optically reflective information structure is illuminated by the LED light.

Embodiment 4: The lighting structure according to Embodiment 2, the optically reflective information structure includes one of a printed reflective ink, a hot stamping, an ink jet printing, a hot press molding, a laser engraving, a screen printing, a thermal transfer printing, a steel mold embossing, an etching, and a combination thereof.

Embodiment 5: The lighting structure according to Embodiment 1, the appearance decorative component further includes a non-transmitting portion formed by printing a non-transmitting area over a light-transmitting material, or by using a dual injection molding with both a light-transmitting plastic and a non-transmitting plastic.

Embodiment 6: The lighting structure according to Embodiment 1, the appearance decorative component includes one of a transparent silicone material, a plastic material, a glass material, a light-transmitting material, and a combination thereof.

Embodiment 7: The lighting structure according to Embodiment 1, the light-emitting unit is a side-emitting LED component which emits the LED light when activated, and the LED light enters the light guide from a side surface thereof.

Embodiment 8: The lighting structure according to Embodiment 1, the light guide includes one of a transparent silicone material, a PC material, a PMMA material, a COP material, a glass material, a light guide material, and a combination thereof.

Embodiment 9: A lighting structure, includes: a first light-emitting unit and a second light-emitting unit emitting a first LED light and a second LED light, respectively, when activated; a circuit substrate configured to provide the first light-emitting unit and the second light-emitting unit to be configured thereon and to individually control the first light-emitting unit and the second light-emitting unit; a first light guide and a second light guide configured to abut a side of the first light-emitting unit and the second light-emitting unit to guide the first LED light and the second LED light, respectively; and an appearance decorative component configured above the first light guide and the second light guide.

Embodiment 10: The lighting structure according to Embodiment 9, the first light guide and the second light guide include a first optically reflective information structure and a second optically reflective information structure, respectively, including a third information and a fourth information, respectively, wherein the first optically reflective information structure and the second optically reflective information structure display the third information and the fourth information, respectively, with a luminous effect, when illuminated by the first LED light and the second LED light, respectively.

Embodiment 11: The lighting structure according to Embodiment 10, the third information and the fourth information are configured to overlap or not overlap in position when illuminated.

Embodiment 12: The lighting structure according to Embodiment 10, when only the first light-emitting unit is independently activated, only the first LED light illuminates the first optically reflective information structure to display only the third information with a luminous effect; when only the second light-emitting unit is independently activated, only the second LED light illuminates the second optically reflective information structure to display only the fourth information with a luminous effect.

Embodiment 13: A lighting structure, includes: an appearance decorative component; a light-emitting unit emitting an LED light when activated; a circuit substrate configured to provide the light-emitting unit to be configured thereon and to control the light-emitting unit; a light guide configured to abut a side of the light-emitting unit to guide the LED light to propagate toward the appearance decorative component; and a light-transmitting touch panel module attached to one side of the appearance decorative component.

Embodiment 14: The lighting structure according to Embodiment 13, the light guide further includes a second surface including an optically reflective information structure including a first information, wherein the optically reflective information structure displays the first information with a luminous effect when illuminated by the LED light.

Embodiment 15: The lighting structure according to Embodiment 14, the light-transmitting touch panel module is configured below the appearance decorative component, and when a user touches the light-transmitting touch panel module, it is configured to send out a feedback signal to trigger a first response accordingly, wherein the first response includes illuminating or de-illuminating the optically reflective information structure.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A lighting structure, comprising:

a first light-emitting unit and a second light-emitting unit emitting a first LED light and a second LED light, respectively, when activated;

a circuit substrate having a first surface and a second surface opposite to the first surface and configured to provide the first light-emitting unit and the second light-emitting unit to be configured thereon and to individually control the first light-emitting unit and the second light-emitting unit;

a first light guide and a second light guide configured to guide the first LED light and the second LED light, respectively; and an appearance decorative component configured above the first light guide and the second light guide, wherein the first light-emitting unit and the second light-emitting unit are configured on the first surface and the second surface, respectively, and positioned on a same side edge of the circuit substrate, the first light guide and the second light guide are configured on the first surface and the second surface, respectively, configured to abut the first light-emitting unit and the second light-emitting unit, respectively, and separated from each other by the circuit substrate, and the circuit substrate further functions as a single base for supporting and mounting the first light-emitting unit, the second light-emitting unit, the first light guide and the second light guide in addition to functioning as a control circuitry for individually controlling the first light-emitting unit and the second light-emitting unit.

2. The lighting structure according to claim 1, wherein the first light guide and the second light guide comprise a first optically reflective information structure and a second optically reflective information structure, respectively, comprising a third information and a fourth information, respectively, wherein the first optically reflective information structure and the second optically reflective information structure display the third information and the fourth information, respectively, with a luminous effect, when illuminated by the first LED light and the second LED light, respectively.

3. The lighting structure according to claim 2, wherein the third information and the fourth information are configured to overlap or not overlap in position when illuminated.

4. The lighting structure according to claim 2, wherein when only the first light-emitting unit is independently activated, only the first LED light is emitted to illuminate the first optically reflective information structure to display only the third information with a luminous effect; when only the second light-emitting unit is independently activated, only the second LED light is emitted to illuminate the second optically reflective information structure to display only the fourth information with a luminous effect.

5. AThe lighting structure according to claim 1, further comprising:

a light-transmitting touch panel module attached to one side of the appearance decorative component.

6. The lighting structure according to claim 5, wherein the light-transmitting touch panel module is configured below the appearance decorative component, and when a user touches the light-transmitting touch panel module, it is configured to send out a feedback signal to trigger a first response accordingly, wherein the first response comprises illuminating or de-illuminating the first optically reflective information structure and the second optically reflective information structure.

* * * * *